(12) United States Patent
Berger et al.

(10) Patent No.: US 8,038,923 B2
(45) Date of Patent: Oct. 18, 2011

(54) METHODS OF FORMING A PART USING SHAPE MEMORY POLYMERS

(75) Inventors: Elisabeth J. Berger, Farmington Hills, MI (US); Ingrid A. Rousseau, Clinton Township, MI (US); John N. Owens, Franklin, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/356,518

(22) Filed: Jan. 20, 2009

(65) Prior Publication Data
US 2010/0181698 A1 Jul. 22, 2010

(51) Int. Cl.
*B28B 7/30* (2006.01)
(52) U.S. Cl. ......... 264/313; 264/230; 264/318; 264/314
(58) Field of Classification Search .................. 264/230, 264/313, 318, 314
See application file for complete search history.

(56) References Cited

U.S. PATENT DOCUMENTS

| | | | | |
|---|---|---|---|---|
| 3,934,810 | A * | 1/1976 | Henning | 249/117 |
| 4,110,396 | A * | 8/1978 | Reynolds | 264/236 |
| 4,388,356 | A * | 6/1983 | Hrivnak et al. | 428/36.92 |
| 5,858,295 | A * | 1/1999 | McDowell | 264/314 |
| 6,598,969 | B2 * | 7/2003 | Asano | 351/123 |
| 6,986,855 | B1 * | 1/2006 | Hood et al. | 264/219 |
| 7,188,498 | B2 | 3/2007 | Browne et al. | |
| 2005/0211870 | A1 * | 9/2005 | Browne et al. | 249/134 |
| 2007/0152380 | A1 * | 7/2007 | Muller et al. | 264/516 |
| 2008/0201914 | A1 * | 8/2008 | Turner et al. | 24/289 |
| 2009/0146331 | A1 * | 6/2009 | Hofmann et al. | 264/2.2 |

* cited by examiner

*Primary Examiner* — Joseph Del Sole
*Assistant Examiner* — David N Brown, II
(74) *Attorney, Agent, or Firm* — Dierker & Associates, P.C.

(57) ABSTRACT

One method of forming a part includes deforming a shape memory polymer from a permanent shape into a temporary shape, where the permanent shape of the shape memory polymer is a predetermined part shape and the temporary shape is a shape larger than the predetermined part shape. The shape memory polymer in each of the permanent shape and the temporary shape defines a cavity therein. The method further includes introducing a molding material into the cavity of the shape memory polymer, and reverting the shape memory polymer back into its permanent shape. Other methods for forming the part are also disclosed herein.

25 Claims, 3 Drawing Sheets

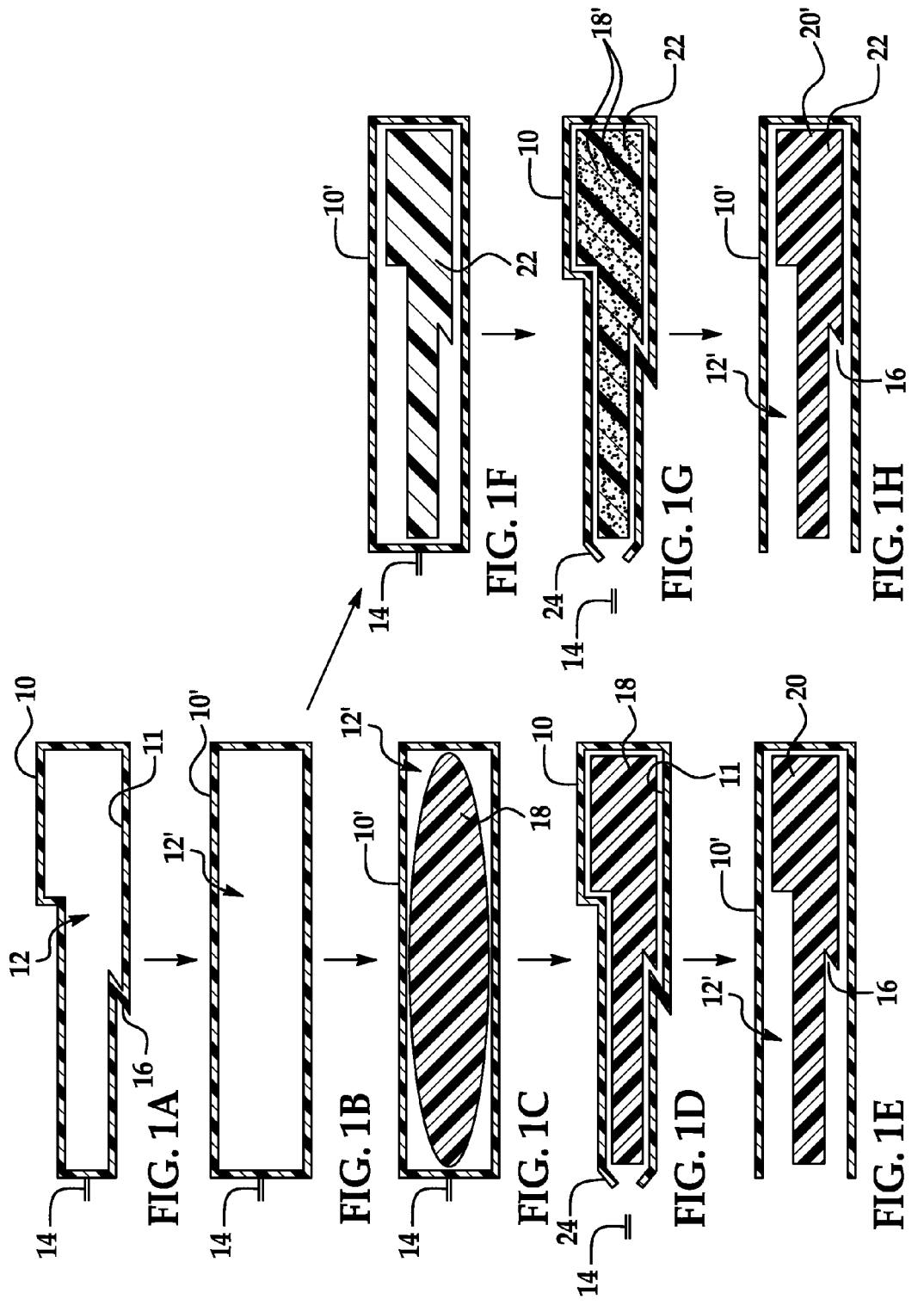

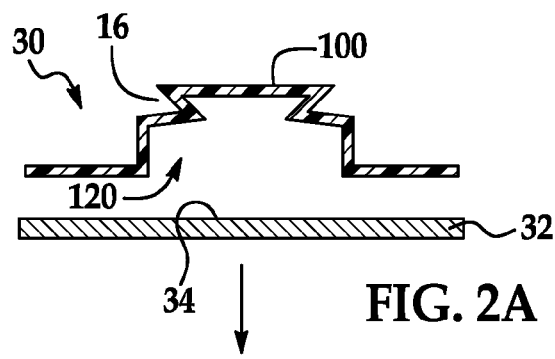
FIG. 2A
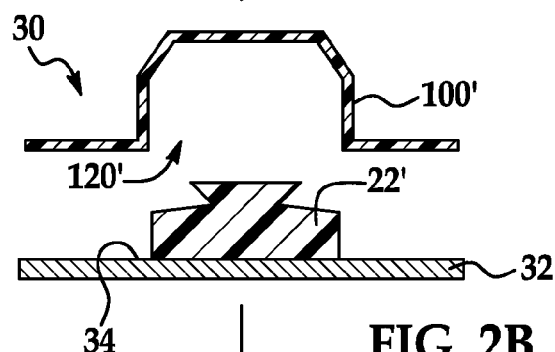
FIG. 2B
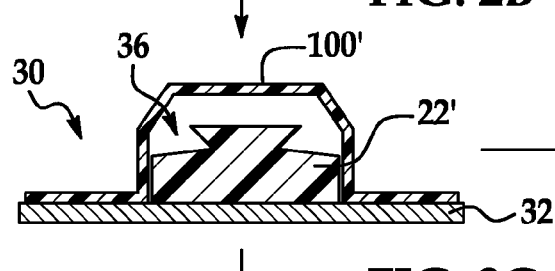
FIG. 2C
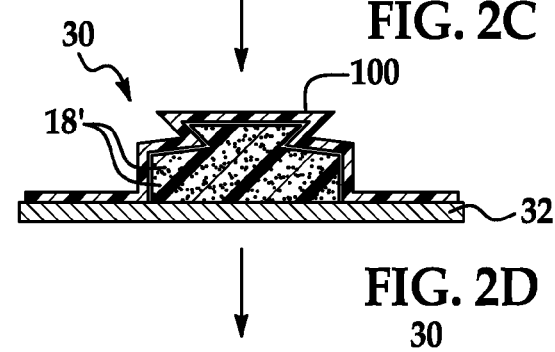
FIG. 2D
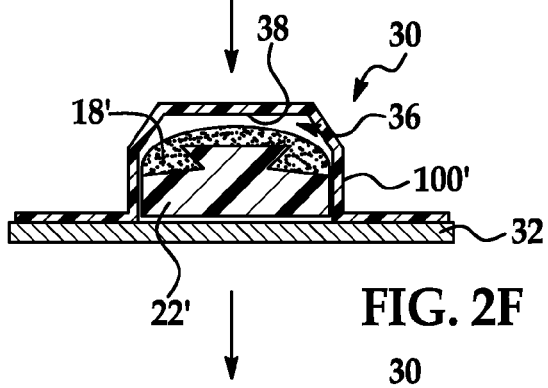
FIG. 2F
FIG. 2E
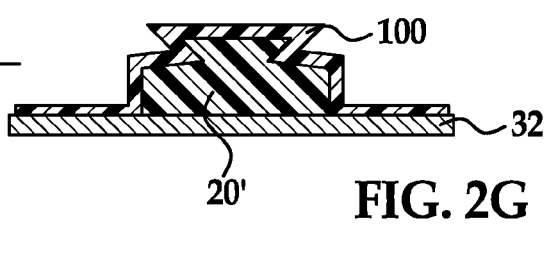
FIG. 2G

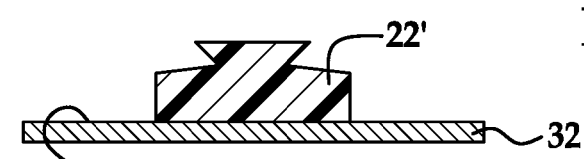
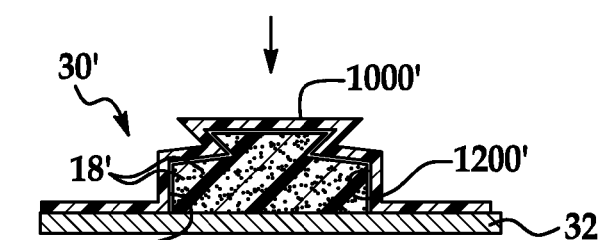
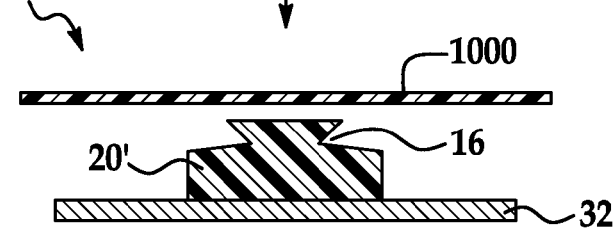
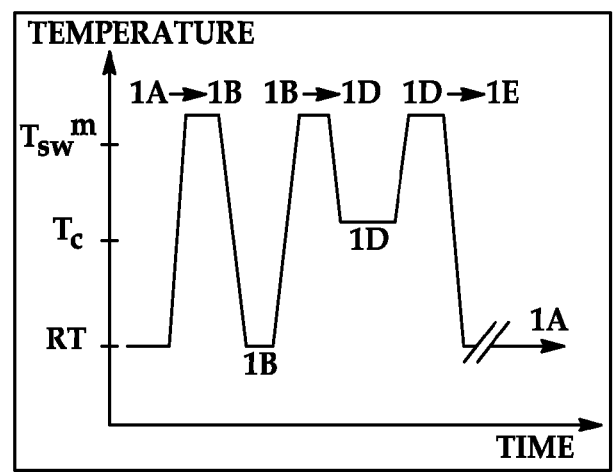
FIG. 4

US 8,038,923 B2

METHODS OF FORMING A PART USING SHAPE MEMORY POLYMERS

TECHNICAL FIELD

The present disclosure relates generally to forming methods, and more particularly, to a method of forming a part using shape memory polymers.

BACKGROUND

Various automotive and/or aerospace parts including, for example, structural parts, internal cabin parts, and/or the like are often formed using conventional molding processes such as compression molding, injection molding, extrusion molding, blow molding, etc. Although the foregoing molding processes tend to be suitable for forming parts having relatively simple geometries, difficulties may arise when molding parts having geometries with higher complexity. For example, a part may include one or more small, intricate features that may, in some instances, render molding the part using conventional molding techniques rather difficult. Yet further, such small, intricate features may hinder or even prevent removal of the part from a molding tool once the component is formed. In these cases, additional removal procedures using additional machinery and/or materials may be needed to remove the part from the molding tool, which may, in some instances, increase forming time and/or costs and/or energy consumption associated with such removal procedures.

SUMMARY

Methods of forming a part are disclosed herein. One example of the method includes deforming a shape memory polymer from a permanent shape into a temporary shape, wherein the permanent shape is a predetermined part shape, and the temporary shape is a shape larger than the predetermined part shape. The shape memory polymer in each of the permanent shape and the temporary shape defines a cavity therein. The method further includes introducing a molding material into the cavity of the shape memory polymer and reverting the shape memory polymer back to its permanent shape.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A through 1E together schematically depict an example of a method of forming a part having at least one die-locked feature;

FIGS. 1A, 1B and 1F through 1H together schematically depict another example of the method of forming a part;

FIGS. 2A through 2E together schematically depict yet another example of the method of forming a part;

FIGS. 2A through 2C, 2F, 2G and 2E together schematically depict still another example of the method of forming the part;

FIGS. 3A through 3D together schematically depict an example of another method of forming a part; and FIG. 4 is a graph depicting the temperature relationships between at least some of the steps of the example of the method depicted in FIGS. 1A through 1E.

DETAILED DESCRIPTION

Embodiment(s) of the method as disclosed herein may advantageously be used to form a part having at least one die-locked feature. The embodiment(s) of the method at least 1) allow the part to be easily removed from a forming tool without having to employ additional machinery, materials, and/or labor, especially when the part includes at least one die-locked feature, 2) are relatively simple to use, are relatively inexpensive to perform, and may be applied for forming a number of different parts, and 3) allow the formation of the part, as well as those parts including one or more die-locked features, without having to employ alternative and/or additional molding techniques or processes.

Various examples of the part forming method are disclosed herein. Generally, the methods include using a shape memory polymer as a mold. Some embodiments of the method include the use a molding material, designated as reference numeral 18 (see, e.g., FIGS. 1C-1E), which may, in an example, be a low pressure molding compound or other reinforced and/or non-reinforced materials that may be introduced into the shape memory polymer mold. Other embodiments of the method include the use of another molding material, designated as reference numeral 18' (see, e.g., FIGS. 1G-1H, the FIG. 2 series, and the FIG. 3 series), which is a liquid resin used in combination with a preform. Further details of the methods and the materials (e.g., 18, 18') used in such methods will be discussed further hereinbelow.

Referring now to the drawings, an example of one method of forming a part is schematically depicted together in FIGS. 1A through 1E, and another example of this method is schematically depicted together in FIGS. 1A, 1B, and 1F through 1H.

In both of the foregoing examples, the method begins by forming a shape memory polymer 10 into a shape where inner surface(s) thereof (e.g., inner surface 11 as shown in FIG. 1A) conforms to a predetermined shape of a part 20 (shown in FIGS. 1E, 1H, 2E, 2G, and 3D) to be formed. As used herein, the term "predetermined part shape" refers to the desirable shape of the ultimately formed part. Generally, the predetermined part shape is any desirable simple or complex, regular or non-regular geometric shape, including solid parts and hollow parts. In some instances, the predetermined part shape also includes at least one die-locked feature. A "die-locked feature" refers to feature(s) of the part that cause die-lock of the part in the molding tool. "Die-lock" occurs when the part cannot be removed from the molding tool using conventional removal methods because of the geometry of the part.

It is to be understood that although the various embodiments of the method disclosed herein may be applied to parts having simple or complex geometries without die-locked features, the examples depicted in the Figures, however, include at least one die-locked feature 16. In the examples shown in FIGS. 1A through 1H, the die-locked feature 16 is shown as an undercut. In the examples shown in FIGS. 2A through 2E and in FIGS. 3A through 3D, the die-locked feature 16 is shown as a dove tail.

In an embodiment, the shape memory polymer 10 is originally formed into a permanent shape. Forming the shape memory polymer 10 into its permanent shape may be accomplished, for example, by molding the shape memory polymer using a molding tool. After being molded, the shape memory polymer is heated to a temperature sufficient to deform the shape memory polymer within the molding tool, thereby rendering it removable from the molding tool. The temperature sufficient to deform the shape memory polymer is a temperature above a switching temperature of the shape memory polymer. The switching temperature will be described in further detail below. During removal of the shape memory polymer from the molding tool, the shape memory polymer may be maintained in its heated state (or reheated if cooled) to return the shape memory polymer to its permanent shape and thereafter cooled under no external constraints to set the permanent shape. The shape memory polymer may be a thermoplastic polymer or a thermoset polymer. If the shape memory polymer is a thermoplastic polymer, the recovery of the permanent shape of the shape memory polymer is enabled by physical cross-links present in the polymeric structure. If the shape memory polymer is a thermoset polymer, the recovery of the permanent shape is enabled by the covalent cross-links. In either case, the presence of physical or covalent cross-links allows for the reversion of the shape memory polymer from another shape (e.g., a temporary shape as described in further detail below) to its permanent shape by releasing stored energy imparted to the system during the deformation at a suitable temperature and subsequent cooling to set a new shape.

The permanent shape of the shape memory polymer 10, as referred to herein in reference to FIGS. 1A through 1H, corresponds to the predetermined part shape. In its permanent shape, as shown in FIG. 1A, the shape memory polymer 10 includes at least the die-locked feature 16 and a cavity 12 defined in the shape memory polymer 10. The cavity 12, in some embodiments, includes a valve 14 operatively connected thereto. In an embodiment, the cavity 12 may include more than one valve 14. As will be described in further detail below, the valve(s) 14 may be used to control a flow of fluid into or out of the cavity 12. In a non-limiting example, the valve(s) 14 may be used to allow a molding material to be introduced into the cavity 12. In another example, the valve(s) 14 may be used to allow a gas, water, or a solvent into or out of the cavity 12 in order to increase/decrease pressure or to draw a vacuum from inside the cavity 12 at one or more instances during a molding process, which will be described further below. In some instances, multiple valves 14 may be used to simultaneously inject material and draw a vacuum.

Referring now to FIG. 1B, the shape memory polymer 10 is deformed from its permanent shape into a temporary shape. The shape memory polymer 10' in its temporary shape includes any shape that is volumetrically larger than the predetermined part shape and, thus, the permanent shape of the shape memory polymer 10. The temporary shape 10' may be configured so that the predetermined part shape may be removable therefrom. For purposes of illustration, the shape memory polymer 10' in its temporary shape is depicted in FIG. 1B as a rectangular shape including the cavity 12' defined therein.

In an embodiment, deformation of the shape memory polymer 10 (i.e., in its permanent shape) into the shape memory polymer 10' (i.e., in its temporary shape) is accomplished by heating the shape memory polymer 10 to a temperature above its switching temperature $T_{sw}$ (shown in FIG. 4). As used herein, the "switching temperature" ($T_{sw}$) of the shape memory polymer 10, 10' refers to the temperature at which the shape memory polymer becomes substantially easily deformable and, in combination with a force (as will be described in further detail below), may be switched from its permanent shape into its temporary shape. The switching temperature ($T_{sw}$) also refers to the temperature at which the shape memory polymer reaches its low modulus state and may spontaneously revert from its temporary shape back into its permanent shape (which will also be described in further detail hereinbelow). It is to be understood that the switching temperature varies depending on the chemistry of the shape memory polymer selected. Non-limiting examples of suitable shape memory polymers include epoxy-based systems, acrylate-based systems, styrene-based systems, or olefin-based systems that may also include fillers (e.g., inorganic fillers) or other active materials (such as, e.g., shape memory alloy wires, magneto-responsive fillers, electroactive fillers, photo-responsive organic dyes, and/or the like). It is to be understood that fillers may be reinforcing fillers, which improve the mechanical properties of the shape memory polymer.

In addition to heating the shape memory polymer 10 to switch it from its permanent shape to its temporary shape, a force is applied inside the cavity 12 to allow such transformation. An example of a suitable force that may be applied inside the cavity 12 includes pressure. In some instances, the pressure inside the cavity 12 may be increased by introducing therein a gas, water, or other material through the valve 14. In these instances, the gas, water, or other material may be heated or cooled so that the shape memory polymer 10 remains at the appropriate temperature above its switching temperature during the deformation. Yet another example of a suitable force that may be applied inside the cavity 12 includes a mechanical force. Such mechanical forces may be applied inside the cavity 12 by, e.g., injecting a material inside the cavity 12 through the valve(s) 14, applying a tensile force to an outer surface of the shape memory polymer 10 (e.g., pulling the shape memory polymer open using gripping features (e.g., eyelets) located on the outer surface of the shape memory polymer), or the like. It is also to be understood that when one or more forces are applied inside the cavity 12 in addition to heating the shape memory polymer 10, the heat and the force may be applied sequentially or substantially simultaneously.

Once the shape memory polymer 10 has been changed from its permanent shape into its temporary shape, the temporary shape of the shape memory polymer 10' may be fixed or otherwise set by cooling the shape memory polymer 10' to a temperature below its switching temperature $T_{sw}$. FIG. 4 shows that the shape memory polymer 10' is cooled to about room temperature (RT). It is to be understood, however, that any temperature below the switching temperature $T_{sw}$ will suffice to set the shape memory polymer 10' into the temporary shape. In a non-limiting example, the shape memory polymer 10' is cooled to a temperature ranging from about 10° C. to about 20° C. below its switching temperature.

The examples of the method of forming the part further include introducing the molding material 18 into the cavity 12' of the shape memory polymer 10' in its temporary shape. In one example of the method, the molding material 18 is a low-pressure molding compound, which is injected into the cavity 12' (as shown in FIG. 1C) through the valve(s) 14. Non-limiting examples of low-pressure molding compounds include a sheet molding compound including a crystallizable polyester resin (e.g., LPMC™, manufactured by Preferred Molding Compounds, Ontario, Calif.), a low pressure casting compound (e.g., plaster of Paris), a liquid rubber, or combinations thereof. Further, the molding material 18 generally has substantially the same volume as the final part 20 (as shown in FIG. 1E).

After the molding compound 18 has been introduced into the cavity 12', the shape memory polymer 10' is then reverted back into its permanent shape (as shown at reference numeral 10 in FIG. 1D). In an embodiment, reverting the shape memory polymer 10' back into its permanent shape is accomplished by heating the shape memory polymer 10' to a temperature above its switching temperature $T_{sw}$ (as shown in FIG. 4), thereby reaching the low modulus and deformable state of the shape memory polymer. In this state, the shape memory polymer 10' reverts back into its original permanent shape 10. It is to be understood that reversion of the shape memory polymer 10' may be accomplished by applying heat. It is to be understood that because the reversion of the shape memory polymer 10, 10' from its temporary shape back into its permanent shape is due, at least in part, to stored energy within the polymer network, a force is generally not required to complete the reversion.

Once the temporary-shaped shape memory polymer 10' has been reverted back into its permanent shape, the shape memory polymer 10 is cooled to a temperature below its switching temperature $T_{sw}$. At this temperature, the shape memory polymer 10 is set into its permanent shape. Cooling the shape memory polymer 10 also conforms the low-pressure molding compound 18 inside the cavity 12, 12' into the predetermined part shape defined by the inner surface(s) (e.g., the inner surface 11) of the shape memory polymer 10. In an example, the low-pressure molding compound 18 is then cured at a temperature $T_c$ (as shown in FIG. 4), which is below the switching temperature $T_{sw}$ of the shape memory polymer 10. In another example, the low-pressure molding compound 18 is pre-cured at a first curing temperature $T_{c1}$, which is lower than the switching temperature $T_{sw}$, to conform the material 18 to the part shape, and then the material 18 is post-cured at a second curing temperature $T_{c2}$, which is higher than the switching temperature $T_{sw}$. It is to be understood that generally it does not matter if the shape memory polymer deforms at the second curing temperature $T_{c2}$ (which is higher than the switching temperature $T_{sw}$) because the pre-curing of the low-pressure molding compound 18 imparted, to the compound 18, the predetermined part shape and the shape memory polymer is thereafter no longer used for forming the part 20.

At the curing temperature $T_c$ or $T_{c1}$, the low-pressure molding compound 18 is set into the predetermined part shape and forms the part 20. Curing may be accomplished at a temperature below the switching temperature of the shape memory polymer 10, 10' when the molding material 18 has predetermined curing kinetics (i.e., when the reaction time for curing is significantly longer than the time for switching the shape memory polymer back to its permanent shape when heated above its switching temperature $T_{sw}$, which is above the curing temperature $T_c$). The reaction time for curing is generally dependent upon the molding material 18 selected and the curing temperature $T_c$ of the molding material 18 relative to the switching temperature $T_{sw}$ of the shape memory polymer. In a non-limiting example, if the curing temperature $T_c$ ranges from about 10° C. to about 30° C. below the switching temperature $T_{sw}$, then a targeted reaction time for curing would be about ten times longer than the time for switching. It is to be understood that the curing temperature $T_c$ of the molding material 18 may be any temperature that is less than the switching temperature $T_{sw}$ of the shape memory polymer 10, 10' (and, in some instances, is room temperature). It is further to be understood that having the curing temperature $T_c$ below the switching temperature ensures that the shape memory polymer 10 is not prematurely and undesirably switched to a temporary shape.

After the part 20 is formed (i.e., the molding compound 18 has been cured), the shape memory polymer 10 is deformed back into the temporary shape (as shown at reference numeral 10' in FIG. 1E). It is to be understood that in the instant method step (i.e., when the shape memory polymer 10 is deformed back into the temporary shape after the part 20 is formed), the temporary shape may be any shape having a cross-section that is larger than that of the part 20. In the example shown in FIG. 1E, the temporary shape is the same shape as the temporary shape 10' described above in conjunction with, e.g., FIG. 1B. Deforming the shape memory polymer 10 back into the temporary shape (10') may be accomplished by heating the shape memory polymer 10 to a temperature above its switching temperature $T_{sw}$ (as shown in FIG. 4). A force is also applied to the cavity 12 of the shape memory polymer 10 by, for example, pressurizing the cavity 12 or applying a mechanical force to the cavity 12. In an embodiment, prior to setting, or during the setting of, the shape memory polymer 10' in its temporary shape, the valve(s) 14 are removed from the shape memory polymer 10' and an end 24 of the shape memory polymer 10' is opened up (as shown in FIG. 1D) so that the part 20 may be removed from the cavity 12'. In an example, the valve(s) 14 may be clamped or otherwise attached to the shape memory polymer 10' so that when heat is applied to the end 24, and the valve(s) 14 are removed, the end 24 of the shape memory polymer is deformed to its more open temporary shape for removal of the part 20 therefrom. In another example, the valve(s) 14 may be removed while the shape memory polymer 10 is in its permanent shape, and then the shape memory polymer 10' may be deformed to its temporary shape for removal of the part 20 therefrom. It is to be understood that because the valve 14 has been removed, in addition to heating the shape memory polymer 10 ', deforming the shape memory polymer 10 ' into its more open temporary shape may be accomplished using an externally applied mechanical force instead of using pressure. The shape memory polymer 10' is then cooled to a temperature below its switching temperature $T_{sw}$ in order to set the open-ended version of the temporary shape. The shape memory polymer 10' may then be used to form another part of the same shape.

Referring back to FIG. 1B, and then to FIGS. 1F through 1H, another example of the method is depicted. After the shape memory polymer 10 has been deformed from its permanent shape and set into its temporary shape, as shown in FIG. 1B, and before the molding material 18' (in this example, the liquid resin is used as the molding material 18') is introduced into the cavity 12', a three-dimensional fiber preform 22 is introduced into the cavity 12' (as shown in FIG. 1F). It is to be understood that the preform 22 may be made of a material that is deformable, and may be shaped to include die-locked features. Thus, the shape of the three-dimensional fiber preform 22 (as shown in the pertinent Figures) corresponds to the predetermined part shape.

After introducing the three-dimensional fiber preform 22 into the cavity 12', the shape memory polymer 10' is reverted back into its permanent shape, as shown in FIG. 1G. This may be accomplished, for example, by heating the shape memory polymer 10' to a temperature above its switching temperature $T_{sw}$. In an embodiment, heating may begin at an end of the shape memory polymer 10' (e.g., the end farthest from the valve 14) and gradually continued along the shape memory polymer 10' until an opposite end of the shape memory polymer 10' is heated. As a result, the shape memory polymer 10' gradually deforms from the temporary shape back into the permanent shape, which conforms around the preform 22. It is to be understood that the gradual deformation of the shape memory polymer 10 back into the permanent shape allows for a good fit between the preform 22 and the shape memory polymer 10 (including the die-locked feature 16) in its permanent shape. It is further to be understood that proper selection of the heat to be applied to gradually deform the shape memory polymer 10 back into the permanent shape depends, at least in part, on the shape of the preform 22 and the permanent shape of the shape memory polymer 10. Thereafter, the shape memory polymer 10 (now in its permanent shape) is cooled to a temperature below its switching temperature $T_{sw}$ to set the permanent shape of the shape memory polymer 10.

Still with reference to FIG. 1G, the molding material 18' is introduced into the cavity 12 (not shown in FIG. 1G) of the shape memory polymer 10 such that it impregnates the three-dimensional preform 22. As previously mentioned, in this embodiment, the molding material 18' is a liquid resin. Non-limiting examples of suitable resins includes epoxies, polyesters, vinyl esters, or urethanes. In an example, the molding material/resin 18' may be introduced into the cavity 12 via injection through the valve 14 in the presence of a vacuum (drawn via another valve, not shown) or, otherwise, without a vacuum.

The molding material/resin 18' is thereafter cured at a temperature below the switching temperature $T_{sw}$ of the shape memory polymer 10 when the resin 18' has predetermined curing kinetics. At this temperature, the molding material 18' is set into the predetermined part shape and forms the part 20', as shown in FIG. 1H.

After the part 20' is formed, the shape memory polymer 10 is deformed back into its temporary shape (as shown at reference numeral 10' in FIG. 1H). Deforming the shape memory polymer 10 may be accomplished by heating the shape memory polymer 10 to a temperature above its switching temperature $T_{sw}$ and applying pressure or a mechanical force to the cavity 12 or to an outside surface of the shape memory polymer 10, as described hereinabove. As previously described, in an embodiment, prior to, or while, setting the shape memory polymer 10' in its temporary shape, the valve(s) 14 are removed from the shape memory polymer 10 and an end 24 of the shape memory polymer 10 is opened up (as shown in FIG. 1G) so that the part 20' may be removed from the cavity 12'.

Thereafter, the resultant shape memory polymer 10' is cooled to a temperature below its switching temperature $T_{sw}$ to set the temporary open-ended shape. While the shape memory polymer 10' is in its temporary open-ended shape, the part 20' is then removed from the cavity 12'.

Another example of the method of forming a part 20 is schematically depicted in FIGS. 2A through 2E, while still another example of the method is schematically depicted in FIGS. 2A through 2C, 2F, 2G, and 2E.

In both of the examples of the FIG. 2 series, the shape memory polymer is a die (referred to herein as reference numeral 100 when the shape memory polymer is in its permanent shape, and by reference numeral 100' when the shape memory polymer is in its temporary shape) of a forming tool 30. Another die 32 of the tool 30 is formed from a non-shape memory polymer (i.e., a material that is not a shape memory polymer such as, for example, a metal, a glass, a ceramic, or a polymer without shape memory properties). In a non-limiting example, the die 100, 100' is an upper die of the forming tool 30 and the other die 32 is a lower die of the forming tool 30. With reference now to FIG. 2A, the shape memory polymer 100 for either of the examples shown in FIGS. 2A through 2G is provided in its permanent shape, which conforms to the predetermined part shape (similar to the examples depicted in FIGS. 1A through 1H). The shape memory polymer 100 includes a cavity 120 defined therein. The lower die 32 is shown as having a relatively flat surface 34. It is to be understood that the lower die 32 may have any suitable shape so long as the shape of the lower die 32 does not result in die-locking of the formed part.

The examples of the method depicted in FIGS. 2A through 2G begin by deforming the shape memory polymer 100 from its permanent shape into a temporary shape, as shown from FIG. 2A to FIG. 2B. Also similar to the examples of the method depicted in FIGS. 1A through 1H, the temporary shape of the shape memory polymer (referred to herein by reference numeral 100') is a shape that is larger than the predetermined part shape and includes a cavity 120' defined therein (as shown in FIG. 2B). Deforming the shape memory polymer 100 into its temporary shape may be accomplished, for example, by heating the shape memory polymer 100 and, in some instances, applying a force. Thereafter, the temporary shape of the transformed shape memory polymer 100' is set by cooling the shape memory polymer 100' below its switching temperature $T_{sw}$.

A preform 22' is placed on the flat surface 34 of the lower die 32, and the cavity 120' of the shape memory polymer 100' in its temporary shape is aligned with the preform 22' (also shown in FIG. 2B). Thereafter, the upper die (i.e., the shape memory polymer 100' in its temporary shape) is drawn toward the lower die 32 such that the cavity 120' substantially surrounds the preform 22' (as shown in FIG. 2C), leaving a gap 36 between the preform 22' and an inner surface of the shape memory polymer 100'.

In the example of the method depicted in FIGS. 2A through 2E, the shape memory polymer 100' is reverted back into its permanent shape by heating the shape memory polymer 10' in its temporary shape (as shown in FIG. 2D). The permanent shape of the shape memory polymer 100 (as shown in FIG. 2E) is set by cooling the shape memory polymer 100 to a temperature below its switching temperature $T_{sw}$.

In an example, the molding material 18' (e.g., similar to those described in reference to the example in FIGS. 1A-1B and 1F-1H) is injected, via a valve, an injection port, or the like (for clarity, not shown in the FIG. 2 series), into the cavity 120 of the shape memory polymer 100 after it is set in its permanent shape (as shown in FIG. 2D). In the instant example, the injected molding material 18' impregnates the preform 22' and conforms to the part shape, as the part shape is defined by the inner surface/interior walls of the shape memory polymer 100 in its permanent shape.

It is to be understood that in another example, the molding material 18' is injected into the cavity 120 before or while the shape memory polymer 100 reverts back to its permanent shape (discussed further hereinbelow in reference to FIG. 2F).

Still referring to the FIG. 2A-2E series, the injected material 18' is then set, via curing, into the predetermined part shape, thereby forming the part 20 shown in FIG. 2E). In this non-limiting example, the molding material 18' may be any of the previously described resins, such as, epoxies, polyesters, vinyl esters, urethanes, and/or the like, and/or combinations thereof.

Still with reference to FIG. 2E, after curing the molding material 18', the shape memory polymer 100 is again deformed, and is converted and set back into its temporary shape 100'. After setting the temporary shape of the polymer 100', the upper die (i.e., the shape memory polymer 100' in its temporary shape) is drawn away from the lower die 32. The part 20 is then removed from the molding tool 30 (not shown in the Figures).

Referring back to FIG. 2C, in the example of the method depicted in FIGS. 2A through 2C, 2F, and 2G, after the shape memory polymer 100 is deformed into its temporary shape (100'), the molding material 18' is introduced into the gap 36 formed between an inner surface 38 of the cavity 120' and the preform 22'. In this example, material 18' introduction is accomplished before reverting or during reversion of the shape memory polymer 100' back into its permanent shape (i.e., introduction occurs while the shape memory polymer 100' is in its temporary shape or as the shape memory polymer 100' is being reverted to its permanent shape) (as shown in FIG. 2F). When the shape memory polymer 100' is reverted back into its permanent shape (as shown at reference numeral 100 in FIG. 2G), the molding material 18' impregnates the preform 22' and then conforms to the predetermined part shape defined by shape memory polymer 100 in its permanent shape. The molding material 18' is cured and set into the predetermined part shape, thereby forming the part 20 (as also shown in FIG. 2G). It is to be understood that the instant example may also be accomplished up-side-down, where the shape memory polymer is the bottom part 32 of the tool 30 and the non-shape memory polymer material is the upper part of the tool. In this example, the molding material 18' is poured (rather than introduced via, e.g., injection) into the cavity 120, 120'.

After curing the molding material 18', the shape memory polymer 100 may be heated above its switching temperature $T_{sw}$ and converted to a temporary shape 100', as shown in FIG. 2E. The upper die (i.e., the shape memory polymer 100' in its temporary shape) is drawn away from the lower die 32, and the part 20 is removed from the molding tool 30.

It is to be understood that the example of the methods described in conjunction with the FIG. 2 series may also be accomplished using a bulk molding material 18 without the preform 22'. In such instances, the material 18 will be injected or otherwise introduced into the cavity 120, 120' and cured in the desirable permanent shape 100. When using the bulk molding material 18, the shape memory polymer 100 does not have to be switched to a temporary shape prior to injection (if the shape memory polymer is the top part of the tool) or pouring (if the shape memory polymer is the bottom part of the tool). The bulk molding material 18 then adopts the contour of the part shape defined by the cavity 120, and is cured at the curing temperature $T_c$ to form the part 20. The part 20 may be removed from the tool 30 by heating the shape memory polymer in its permanent shape 100 to a temperature above its switching temperature $T_{sw}$. At this point, the shape memory polymer may be switched in the presence of, e.g., a mechanical force or pressure to a temporary shape 100', thereby allowing relatively easy removal of the part 20.

Still another example of the method of forming a part is schematically depicted together in FIGS. 3A through 3D. This example is similar to the examples depicted in FIGS. 2A through 2G, where the shape memory polymer is a die (referred to in this example as 1000 when the shape memory polymer is in its permanent shape, and as 1000' when the shape memory polymer is in its temporary shape) of a forming tool 30', and another die 32 of the tool 30' is formed from a non-shape memory polymer. In a non-limiting example, the die 1000, 1000' is an upper die of the forming tool 30' and the other die 32 is a lower die of the forming tool 30'. Unlike the FIG. 2 series however, the permanent shape of the shape memory polymer 1000 in this example is a non-predetermined part shape. As shown in FIG. 3A, the permanent shape of the shape memory polymer 1000 is substantially flat. Further, the temporary shape of the shape memory polymer 1000' conforms to the predetermined part shape. In its temporary shape, the shape memory polymer 1000' includes a cavity 1200' defined therein.

In the instant example, the method begins by placing a preform 22' on the flat surface 34 of the lower die 32 (as shown in FIG. 3A). The preform 22' may, for example, have a three-dimensional shape of the initial part and may be made using a variety of processes including, but not limited to, slurry processes, three-dimensional weaving processes, three-dimensional knitting processes, and/or the like. It is to be understood that the preform 22' (for use in the instant example) may have any shape that will provide a suitable amount of structural resistance to the shape memory polymer 10 when the heat and the force are applied to the shape memory polymer 10 so that the shape memory polymer 10 conforms to the predetermined part shape.

Thereafter, the upper die (i.e., the shape memory polymer 1000 in its permanent shape) is drawn toward the lower die 32. During or after the time in which the shape memory polymer 1000 is drawn toward the lower die 32, the shape memory polymer 1000 is deformed from its permanent shape into its temporary shape (see FIG. 3B). Deforming the shape memory polymer 1000' into its temporary shape may be accomplished, for example, by heating the shape memory polymer 1000 in its permanent shape to a temperature above its switching temperature $T_{sw}$, and forcing the shape memory polymer 1000' around the preform 22' using, e.g., air or fluid pressure and/or mechanical forces. Thereafter, the conformed shape memory polymer 1000' may be cooled to a temperature below its switching temperature $T_{sw}$ to set the temporary shape. It is to be understood that when the shape memory polymer 1000' is deformed into its temporary shape, the shape memory polymer 1000' substantially surrounds the preform 22' (as shown in FIG. 3B).

With reference now to FIG. 3C, a molding material 18' (e.g., the resin as similarly described for the example of the method depicted in FIGS. 1A, 1B and 1F through 1H) is introduced into the cavity 1200' of the shape memory polymer 1000' in its temporary shape. In an example, the molding material 18' is introduced into the cavity 1200' using a valve, an injection port, or the like (not shown in the FIG. 3 series). It is to be understood, however, that if the forming process is accomplished up-side-down (as described above), the molding material 18' may otherwise be poured into the cavity 1200'.

The molding material 18' generally conforms to the predetermined part shape defined by the shape memory polymer 1000' in its temporary shape. The material 18' is set into the predetermined part shape by curing, thereby forming the part 20 (as shown in FIG. 3D). Curing may be accomplished, for example, at a temperature below a switching temperature $T_{sw}$ of the shape memory polymer 1000' in the presence of desired curing kinetics of the molding material 18'.

After curing the molding material 18', with reference now to FIG. 3D, the shape memory polymer 1000' is reverted back into its permanent shape (as shown at reference numeral 1000). This may be accomplished by heating the shape memory polymer 1000' to a temperature above its switching temperature $T_{sw}$, thereby triggering the deformation of the shape memory polymer 1000' from its temporary shape back into its permanent shape. Thereafter, the shape memory polymer 1000 is cooled to a temperature below its switching temperature $T_{sw}$ to set the permanent shape.

After reverting the shape memory polymer 1000 into its permanent shape, the upper die (i.e., the shape memory polymer 1000 now in its permanent shape) is drawn away from the lower die 32. The part 20 is then removed from the molding tool 30'.

FIG. 4 is mentioned hereinabove, and shows examples of the temperature relationships between various steps of the example method of FIGS. 1A through 1E. In this graph, it is to be understood that the actual temperatures may depend on the shape memory polymer(s) and molding material(s) used, and may extend above or below the indicated temperatures as much or as little as is desirable or necessary to achieve the desirable result. It is to be further understood that when cooling below $T_c$, room temperature (RT) does not necessarily have to be obtained. In the examples disclosed herein, it is to be understood that the shape memory polymers 10, 100, 1000 act as jackets which surround and shape various molding materials 18, 18' and/or preforms 22, 22' including the molding material 18, 18' into a desirable predetermined part shape by switching (one or more times) between permanent 10, 100, 100 and temporary 10', 100', 1000' shapes.

It is to be understood that although the several examples of the method described above may be used to form a part, the part may or may not have at least one die-locked feature. It is to be understood that the instant disclosure should not be limited to parts having die-locked features, nor should it be limited to parts that do not have die-locked features.

While several embodiments have been described in detail, it will be apparent to those skilled in the art that the disclosed embodiments may be modified. Therefore, the foregoing description is to be considered exemplary rather than limiting.

The invention claimed is:

1. A method of forming a part, comprising:
    deforming a shape memory polymer from a permanent shape into a temporary shape, wherein the permanent shape is a predetermined part shape and the temporary shape is a shape larger than the predetermined part shape, and wherein the shape memory polymer in each of the permanent shape and the temporary shape defines a cavity therein;
    introducing a three-dimensional fiber preform into the cavity of the shape memory polymer in its temporary shape, the three-dimensional fiber preform having the predetermined part shape;
    then introducing a molding material into the cavity of the shape memory polymer; and
    reverting the shape memory polymer back into its permanent shape.

2. The method as defined in claim 1 wherein the shape memory polymer includes at least one valve operatively connected thereto, the at least one valve controlling a flow of fluid into or out of the cavity of the shape memory polymer.

3. The method as defined in claim 2 wherein the fluid is selected from the molding material, a gas, water, or a solvent.

4. The method as defined in claim 1 wherein deforming the shape memory polymer from the permanent shape into the temporary shape includes:
    heating the shape memory polymer to a temperature above its switching temperature;
    applying a force inside the cavity, thereby changing the shape memory polymer from the permanent shape into the temporary shape, wherein the force is selected from pressure, a mechanical force, or combinations thereof; and
    cooling the shape memory polymer to a temperature below its switching temperature to set the shape memory polymer into the temporary shape.

5. The method as defined in claim 1 wherein the molding material is a low-pressure molding compound selected from a sheet molding compound including a crystallizable polyester resin, a low pressure casting compound, a liquid rubber, or combinations thereof.

6. The method as defined in claim 5 wherein reverting the shape memory polymer back into the permanent shape is accomplished by:
    heating the shape memory polymer to a temperature above its switching temperature, thereby triggering a deformation of the shape memory polymer from the temporary shape back into the permanent shape; and
    cooling the shape memory polymer to a temperature below its switching temperature to set the shape memory polymer in the permanent shape, thereby conforming the low pressure molding compound into the predetermined part shape.

7. The method as defined in claim 5, further comprising curing the conformed low pressure molding compound, wherein curing is accomplished at a temperature below a switching temperature of the shape memory polymer when the molding material has predetermined curing kinetics.

8. The method as defined in claim 7 wherein after curing, the method further comprises:
    deforming the shape memory polymer back into the temporary shape; and
    removing the part from the cavity of the shape memory polymer when the shape memory polymer is in its temporary shape.

9. The method as defined in claim 8 wherein deforming the shape memory polymer back into its temporary shape is accomplished by:
    heating the shape memory polymer to a temperature above its switching temperature;
    applying a force to the cavity to change the shape memory polymer from the permanent shape into the temporary shape; and
    cooling the shape memory polymer to a temperature below its switching temperature to set the shape memory polymer into the temporary shape.

10. The method as defined in claim 9 wherein applying the force to the cavity is accomplished by pressurizing the cavity or applying a mechanical force to the cavity.

11. The method as defined in claim 1 wherein reverting the shape memory polymer back into the permanent shape is accomplished by heating the shape memory polymer to a temperature above its switching temperature, wherein heating begins at a first end of the shape memory polymer and is moved to a second end of the shape memory polymer, thereby gradually deforming the shape memory polymer from the temporary shape back into the permanent shape and around the preform.

12. The method as defined in claim 1 wherein the molding material is a resin, and wherein after reverting the shape memory polymer back into the permanent shape, the resin is introduced into the cavity via injection, whereby the resin impregnates the three-dimensional fiber preform.

13. The method as defined in claim 12, further comprising curing the resin at a temperature that is less than the switching temperature of the shape memory polymer when the resin has predetermined curing kinetics.

14. The method as defined in claim 13 wherein after curing, the method further comprises:
    deforming the shape memory polymer back into the temporary shape; and
    removing the part from the cavity of the shape memory polymer when the shape memory polymer is in its temporary shape.

15. The method as defined in claim 14 wherein deforming the shape memory polymer back into its temporary shape is accomplished by:
    heating the shape memory polymer to a temperature above its switching temperature;
    applying pressure or a mechanical force to the cavity to change the shape memory polymer from the permanent shape into the temporary shape; and cooling the shape memory polymer to a temperature below its switching temperature to set the shape memory polymer into the temporary shape.

16. The method as defined in claim 1 wherein the predetermined part shape includes at least one die-locked feature.

17. A method of forming a part, comprising:
deforming a shape memory polymer from a permanent shape into a temporary shape, wherein the permanent shape is a predetermined part shape and the temporary shape is a shape larger than the predetermined part shape, and wherein the shape memory polymer in each of the permanent shape and the temporary shape defines a cavity therein;
introducing a molding material into the cavity of the shape memory polymer; and
reverting the shape memory polymer back into its permanent shape;
wherein the shape memory polymer is a die of a tool, wherein the tool further includes a non-shape memory polymer other die, and wherein the method further includes:
after deforming the shape memory polymer from the permanent shape into the temporary shape, placing a preform on a surface of the other die; and
prior to introducing the molding material into the cavity, drawing the die toward the other die such that the shape memory polymer in its temporary shape substantially surrounds the preform.

18. The method as defined in claim 1 wherein the molding material is injected into the cavity of the shape memory polymer prior to reverting the shape memory polymer back into its permanent shape, and wherein reverting the shape memory polymer back into its permanent shape causes the molding material to conform to the predetermined part shape.

19. The method as defined in claim 1 wherein after reverting the shape memory polymer back into its permanent shape, the molding material is injected into the cavity of the shape memory polymer and conforms to the predetermined part shape.

20. The method as defined in claim 1 wherein the molding material is injected into the cavity of the shape memory polymer as the shape memory polymer is reverted back into its permanent shape.

21. A method of forming a part, comprising:
deforming a shape memory polymer from a permanent shape into a temporary shape, wherein the permanent shape is a non-predetermined part shape and the temporary shape is a predetermined part shape including a cavity defined therein;
introducing a molding material into the cavity of the shape memory polymer in its temporary shape; and
reverting the shape memory polymer back into its permanent shape;
wherein the shape memory polymer is a die of a tool, the tool further including a non-shape memory polymer other die, and wherein prior to deforming the shape memory polymer from the permanent shape into the temporary shape, the method further includes:
placing a preform on a surface of the other die; and
drawing the die toward the other die such that when the shape memory polymer is deformed to the temporary shape, the shape memory polymer substantially surrounds the preform.

22. The method as defined in claim 21 wherein deforming the shape memory polymer from the permanent shape into the temporary shape includes:
heating the shape memory polymer to a temperature above its switching temperature;
applying a force to the shape memory polymer, thereby changing the shape memory polymer from the permanent shape into the temporary shape, wherein the force is selected from pressure, a mechanical force, or combinations thereof; and
cooling the shape memory polymer to a temperature below its switching temperature to set the shape memory polymer into the temporary shape.

23. The method as defined in claim 21, further comprising curing the molding material at a temperature below a switching temperature of the shape memory polymer in the presence of desired curing kinetics of the molding material.

24. The method as defined in claim 23 wherein curing occurs prior to the reversion of the shape memory polymer back into the permanent shape, and wherein reverting includes:
heating the shape memory polymer to a temperature above its switching temperature, thereby triggering a deformation of the shape memory polymer from the temporary shape back into the permanent shape; and
cooling the shape memory polymer to a temperature below its switching temperature to set the shape memory polymer in the permanent shape.

25. The method as defined in claim 21 wherein the predetermined part shape includes at least one die-locked feature.

* * * * *